(12) United States Patent
Sinno et al.

(10) Patent No.: US 8,781,939 B1
(45) Date of Patent: Jul. 15, 2014

(54) AMATEUR ATHLETE COMPENSATION PRODUCT USING RESIDUAL VALUE

(71) Applicant: FMR LLC, Boston, MA (US)

(72) Inventors: Dina Sinno, Cambridge, MA (US); John McDonough, Nahant, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/078,111

(22) Filed: Nov. 12, 2013

Related U.S. Application Data (60) Provisional application No. 61/886,455, filed on Oct. 3, 2013.

(51) Int. Cl.
  *G06Q 40/02* (2012.01)
  *G06Q 40/06* (2012.01)

(52) U.S. Cl.
  CPC .............. *G06Q 40/06* (2013.01); *G06Q 40/02* (2013.01)
  USPC ............................. 705/36 R; 705/35; 705/39

(58) Field of Classification Search
  USPC ................................................ 705/35–36 R
  See application file for complete search history.

(56) References Cited

U.S. PATENT DOCUMENTS

| | | | | |
|---|---|---|---|---|
| 6,235,176 | B1 * | 5/2001 | Schoen et al. ..................... | 705/4 |
| 7,739,131 | B1 * | 6/2010 | Luedtke ............................ | 705/4 |
| 7,979,337 | B2 * | 7/2011 | Mercier et al. .............. | 705/36 R |
| 8,224,732 | B1 * | 7/2012 | Mahoney .................... | 705/36 R |
| 8,510,198 | B2 * | 8/2013 | Kmak et al. ................. | 705/36 R |
| 8,612,265 | B2 * | 12/2013 | Luedtke ............................ | 705/4 |
| 8,639,604 | B1 * | 1/2014 | Abrahamson ................ | 705/36 R |
| 2003/0018557 | A1 * | 1/2003 | Gilbert et al. .................... | 705/36 |
| 2003/0105692 | A1 * | 6/2003 | Gilbert et al. .................... | 705/35 |
| 2012/0290457 | A1 * | 11/2012 | Mahoney ......................... | 705/35 |
| 2013/0138578 | A1 * | 5/2013 | Epstein ....................... | 705/36 R |

OTHER PUBLICATIONS

Meeting the Need of Student Athletes; ncaa.com; Aug. 8, 2012.*
Meeting the Need of Student Athletes; ncaa.com; Aug. 20, 2012.*
Should Athletes share in their schools profits; Mar. 2012.*
Go Long: Retirement plans for Pro Athletes; Sep. 25, 2012.*
Financial Advisers for Professional Athletes and Entertainers; Sep. 10, 2012.*
Bloomberg, "NFL Free-Agent Lawyer to Unlock $16 Billion in NCAA Athletes," http://www.bloomberg.com/news/2013-10-02/nfl-free-agent-lawyer-set-to-unlock-16-billion-in-ncaa-athletes.html[Oct. 16, 2013 12:02:44 PM]; pp. 1-7.

* cited by examiner

*Primary Examiner* — Neal Sereboff
*Assistant Examiner* — Abhishek Vyas
(74) *Attorney, Agent, or Firm* — Fish & Richardson P.C.

(57) ABSTRACT

A computer-implemented method including, retrieving information indicative of aggregate income that is attributable to a plurality of collegiate sports teams and income that is attributable to a particular collegiate sports team in the plurality, and for the particular collegiate sports team, determining an athlete residual value that is at least partly based on the aggregate income that is attributable to the plurality of collegiate sports teams and the income that is attributable to the particular collegiate sports team in the plurality, determining, based on the athlete residual value, a portion of the aggregate income that is revenue shared with a particular athlete who is a member of the particular collegiate sports team, and causing the determined portion of the aggregate income to be placed in a student athlete retirement trust for the particular athlete.

20 Claims, 4 Drawing Sheets

AMATEUR ATHLETE COMPENSATION PRODUCT USING RESIDUAL VALUE

CLAIM OF PRIORITY

This application claims priority under 35 U.S.C. §119(e) to U.S. Provisional Patent Application No. 61/886,455, filed Oct. 3, 2013, the entire contents of which are hereby incorporated by reference.

BACKGROUND

This invention relates to financial products, and more particularly to amateur athlete compensation.

Amateur athletic programs such as college and university sports programs, in particular college football and basketball teams, derive large sums of money per year from various sources, including but not limited to national and regional broadcast and cable networks that televise games, local, regional and national radio networks that broadcast games, ticket sales, and concessions at stadiums, as well as license fees from collegiate sport branded merchandise. Various organizations oversee athletic programs of many colleges and universities. One such organization is the National Collegiate Athletic Association ("NCAA"). Various rules of athletic organizations (e.g., the NCAA) prevent and/or discourage colleges and universities from paying college athletes (aside from scholarships) direct compensation such as a salary or monetary bonus, e.g., while a college athlete is still in school, in order to preserve a student athlete's amateur status.

SUMMARY

In general, one innovative aspect of the subject matter described in this specification can be embodied in methods that include the actions of retrieving by a computer information indicative of aggregate income attributable to a plurality of collegiate sports teams and a number of amateur student athletes participating in the collegiate sports teams; determining, based on the aggregate income and the number of number of amateur student athletes, a portion of the aggregate income that is revenue shared with a particular amateur student athlete; and causing the determined portion of the aggregate income to be placed in an amateur athletic account that is held in trust for the particular amateur student athlete via an amateur athletic trust. A system of one or more computers can be configured to perform particular operations or actions by virtue of having software, firmware, hardware, a hardware storage device or a combination of them installed on the system that in operation causes or cause the system to perform the actions. One or more computer programs can be configured to perform particular operations or actions by virtue of including instructions that, when executed by data processing apparatus, cause the apparatus to perform the actions.

Another innovative aspect of the subject matter described in this specification can be embodied in methods that include the actions of retrieving by a computer information indicative of aggregate income attributable to a plurality of collegiate sports teams and income attributable to a particular collegiate sports team in the plurality of collegiate sports teams; for a particular collegiate sports team, determining by the computer an athlete residual value for the particular collegiate sports team, the athlete residual value at least partly based on the aggregate income that is attributable to the plurality of collegiate sports teams and the income that is attributable to the particular collegiate sports team; determining, based on the athlete residual value, a portion of the aggregate income that is revenue shared with a particular athlete of the particular collegiate sports team; and causing the determined portion of the aggregate income to be placed in a student athlete retirement trust for the particular athlete. Other embodiments of this aspect include corresponding computer systems, apparatus, and computer programs recorded on one or more computer storage devices, each configured to perform the actions of the methods.

Implementations of the disclosure can include one or more of the following features. In some examples, determining the athlete residual value comprises: determining a first athlete residual component that is based on a ratio of (i) the income that is attributable to the particular collegiate sports team in the plurality, to (ii) the aggregate income that is attributable to the plurality of collegiate sports teams; determining a second athlete residual component that is based on a ratio of (i) a number or an amount of scholarships that is attributable to the particular collegiate sports team in the plurality, and (ii) an aggregate number or an aggregate amount of scholarships is attributable to the plurality of collegiate sports teams; determining a third athlete residual component that is based on a ratio of (i) a number of athletes on the particular collegiate sports team in the plurality, to (ii) an aggregate number of athletes participating in the plurality of collegiate sports teams; and applying a mathematical operation to the first, second, and third athlete residual components. The actions include applying a first weighed value to the first athlete residual component; applying a second weighed value to the second athlete residual component; and applying a third weighed value to the third athlete residual component; wherein applying the mathematical operation comprises: applying the mathematical operation to the first, second, and third weighted athlete residual components.

In still other examples, the action of applying the first, second, and third weighted values causes the determined portion of the aggregate income to be proportionate to the ratio of (i) income attributable to the particular collegiate sports team, to (ii) the income attributable to the plurality of collegiate sports teams. In some examples, the first weighted value has a value of 0.34. In other examples, the weighted value has a value of 0.30. In still other examples, the weighted value has a value of 0.36. The action of determining, based on the athlete residual value, the portion of the aggregate income that is revenue shared with the particular athlete comprises: computing a ratio of (i) an amount of the aggregate income multiplied by the athlete residual value, to (ii) a number of athletes on the particular collegiate sports team in the plurality. The action of determining, based on the athlete residual value, the portion of the aggregate income that is revenue shared with the particular athlete comprises: determining, based on (i) the athlete residual value, (ii) an amount of the aggregate income, and (i) a number of athletes on the particular collegiate sports team in the plurality, the portion of the aggregate income that is revenue shared with the particular athlete. The action of causing the determined portion of the aggregate income to be placed in the student athlete retirement trust for the particular athlete prevents the particular athlete from being paid for participating in the particular collegiate sports team until the particular athlete reaches a specified age. The actions include detecting that the particular athlete has reached a specified age; and causing a disbursement from the student athlete retirement trust to the particular athlete. The actions include detecting that the particular athlete is not NCAA eligible; and causing a disbursement from the student athlete retirement trust to the particular athlete.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments of the invention are set forth in the accompanying drawings and the description below. Other features, objects, and advantages of the invention will be apparent from the description and drawings, and from the claims.

DETAILED DESCRIPTION

A system consistent with this disclosure promotes revenue sharing for college athletes (when they are in retirement) and prevents paying colleges athletes while they are in school.

In this example, a computerized system maintains information indicative of the income (derived and attribute to collegiate sports teams), scholarship quantities (and/or amounts), and number of student athletes per team and per university. Income earned by a university from each collegiate sports team may include, for example, income derived from national or local broadcasting of sporting events, ticket sales, merchandise sales, and concessions at stadiums. A university may consist of various higher education institutes having at least one sports team, e.g., under the purview of the NCAA.

Described below are mechanisms that may permit a university to contribute to the future financial security of their student athletes via student athlete retirement trusts. The student athlete retirement trusts may be various investment vehicles that are managed and controlled by an administrator (rather than the student athlete) for a predefined investment period, e.g., 5, 10, 15, 20, 25, 30, 35, 40 years, and so forth.

Various types of financial/legal arrangements can be adapted to provide a student athlete retirement account. Such a student athlete retirement account would be one that is maintained by a fiduciary that has a fiduciary relationship to the student athlete (or a group of student athletes) calling for the fiduciary to hold the legal title to assets for the benefit of the student athlete. An example of such a vehicle is a trust, including, e.g., revocable trusts, irrevocable trusts. In an example, the student athlete retirement account is a blind trust where the athlete does not know the amount of funds that are held in trust. In another example, the student athlete retirement account can be restricted by various provisions, e.g., a fund reimbursement provision. In this example, a student athlete receives a tuition scholarship. In this example, a condition of the trust is that trust beneficiaries (i.e., the student athletes) who are receiving less than a full (100%) scholarship may later reimburse the school for the portion of tuition that is not covered by the scholarship (e.g., if the student athlete chooses not to pay the uncovered portion of tuition through other means). Accordingly, the trust may include a provision that if the student athlete does not receive an entire scholarship (e.g., a 100% scholarship) the student athlete would have to repay any monies he/she owes to the school out of this account—at a specified time in the future.

In some situations, accounts such as a life insurance trust, an annuity trust, an individual retirement account ("IRA"), a 401(k) account, a 403(b) account and so forth may be used. For IRAs, 401(k) accounts, 403(b) accounts, etc., restrictions would need to be placed on the athlete's access to the account and ability to withdraw assets. Such restrictions could include vesting restrictions and having legal title in a third party similar to a trust.

Therefore, described below is a novel financial/legal arrangement that borrows aspects from arrangements such as trusts. For the purposes herein this arrangement is referred to as an amateur athletic retirement trust that is held in an amateur athletic retirement account. The amateur athletic retirement account holds shares of a financial vehicle, e.g., a mutual fund.

A trust has various parties, including a settlor who transfers some or all of his or her property to a trustee. The trustee holds that property for the trust's beneficiaries. In this example, the college is the settlor and the college transfers part of its assets (income and/or revenue attributable to collegiate sports of the college) into a trust that is held for a particular collegiate athlete and which is administered by a trustee. The trustee includes an appointed employee of a financial institution (e.g., a bank, a brokerage institution, and so forth), an appointed official of the university, and so forth, but not the particular collegiate athlete. The collegiate athlete is the beneficiary of the trust. In an example, if the funds are in an approved tax-deferred arrangement such as an IRA, 401(k) etc. having restrictions noted above, earnings and capital gains may grow tax deferred in the student athlete retirement trust accounts until disbursement, e.g., at a retirement age. In an example, the funds grow tax deferred during a vesting period and are distributed at the end of the vesting period, e.g., at a retirement age.

The collegiate athlete's lack of control over the funds prevents the collegiate athlete from being paid for participating on a collegiate sports team, i.e., in accordance with NCAA guidelines and policies. In an example, a governing body, e.g., the NCAA, enables and monitors revenue sharing between collegiate athletes and universities. In another example, collegiate athletes are engaged, over the course of their lives, in financial education and planning.

Figure 1:
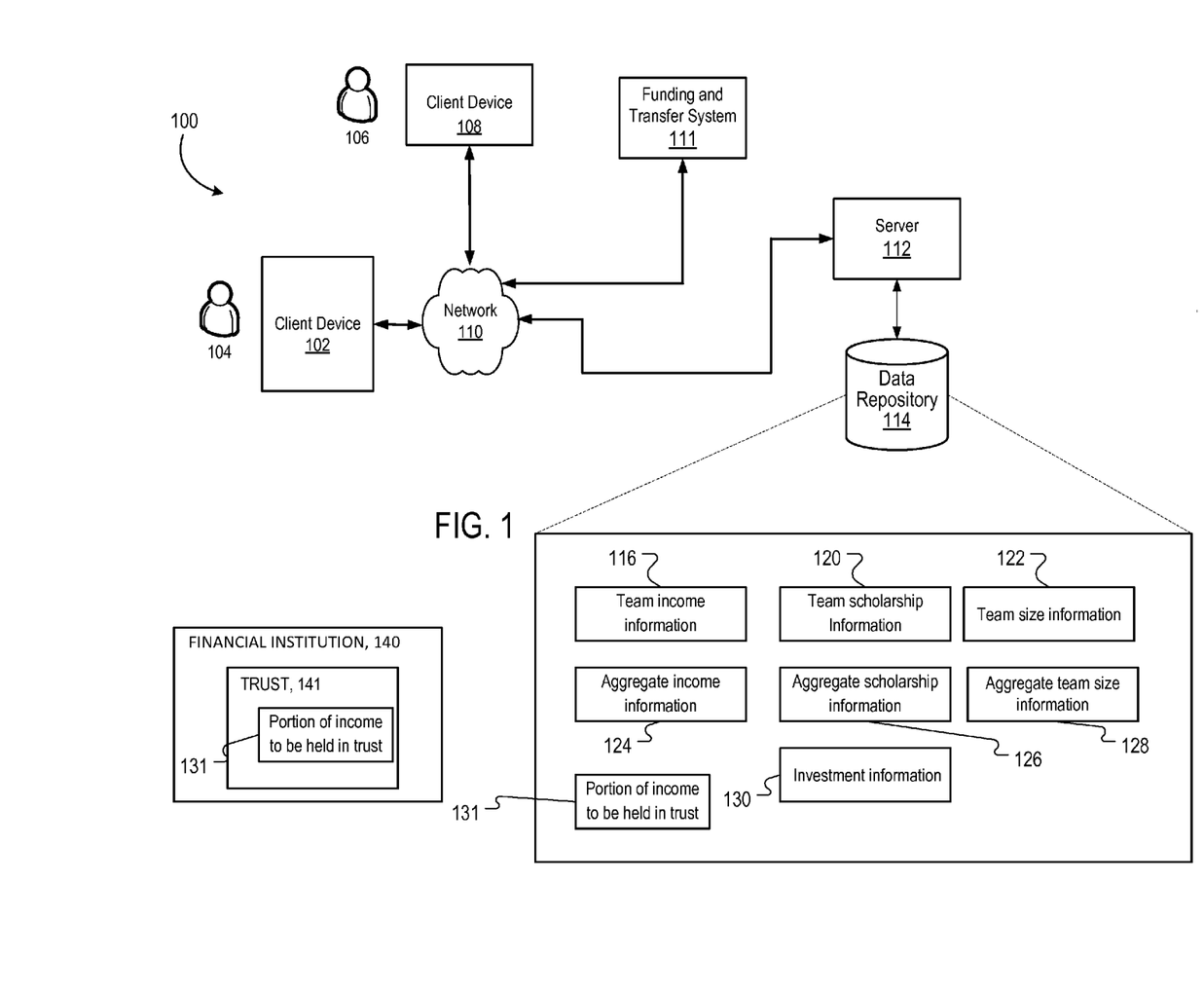
FIG. 1 is a diagram of a system for determining and investing a portion of aggregate income.

Referring now to FIG. 1, an example environment 100 for promoting revenue sharing with collegiate athletes includes client devices 102, 108, network 110, server 112, and data repository 114. Client device 102 is used by user 104. Client device 108 is used by user 106. In this example, user 104 is a collegiate athlete that is subject to, e.g., NCAA rules regarding compensation, and user 106 is an official of a governing organization, e.g., an NCAA official. The users 104, 106 may use the client devices 102, 108 to access server 112 via the network 110. The client devices 102, 108 communicate with each other over network 110 and can run programs having a client-server relationship to each other.

In an example, server 112 may be associated with a college and/or university, e.g., when the college and/or university performs the calculations that determines amounts of funds to apportion among collegiate athletes, e.g., to promote revenue sharing. In another example, server 112 may be associated with a particular financial institution that is holding and/or managing the student athlete retirement trust.

In this example, server 112 obtains, from data repository 114, various types of information, including, e.g., aggregate income information 124 for a plurality of collegiate sports teams at a particular college, team income information 116 indicative of income that is attributable to a specific sports team at the particular college, aggregate income information 126 indicative of aggregate scholarship quantities (and/or amounts) that are attributable to a plurality of collegiate sports teams at the particular college, team scholarship information 120 indicative of scholarship quantities (and/or amounts) that are attributable to a specific sports team at the particular college, aggregate team size information 128 indicative of aggregate team sizes that are attributable to a plurality of collegiate sports teams at the particular college, team size information 122 indicative of the number of players on a specific sports team, and investment information 130.

In an example, the aggregate income is a university's entire income (university aggregate income). In still another example, the aggregate income is the income of the athletic department (athletic department aggregate income). The techniques described herein may be applied with regard to university aggregate income and/or with regard to athletic department aggregate income. In some examples, a user of the system may select which aggregate income (i.e., university aggregate income or athletic department aggregate income) to use in computing athlete residual values.

In this example, investment information 130 includes information indicative of various investment vehicles that are used by the particular college to revenue share income and revenue with collegiate athletes. For example, investment information 130 may include a name of an annuity trust that holds funds in trust for a collegiate athlete and information specifying a name of a financial institution that holds the trust. Investment information 130 may also include information specifying an amount of funds that are held in trust for the student athlete.

In this example, the server 112 generates a graphical user interface (not shown), and the users 104, 106 may view the actual and/or anticipated investments over on the client devices 102, 108. In another example, server 112 also transmits annuity investment information related to portions of the aggregate income previously placed in a student athlete retirement trust, e.g., for a particular collegiate athlete, particular collegiate team, or plurality of collegiate teams.

In an example, an administrator of a particular college may enter into the data repository 114 the various types of information 116, 120, 122, 124, 126, 128, 130. In another example, server 112 may obtain one or more types of information 116, 120, 122, 124, 126, 128, 130 by accessing NCAA compliance forms generated by student athletes and participating universities. Server 112 parses the compliance forms and selects one or more types of information 116, 120, 122, 124, 126, 128, 130. As described in further detail below, one or more types of information 116, 120, 122, 124, 126, 128, 130 are used by server 112 in determining a portion of aggregate income information 124 and/or team income information 116 that is held in trust for a particular athlete.

In the example of FIG. 1, environment 100 also includes financial institution 140. In this example, user 104 is a NCAA collegiate athlete and financial institution 140 holds trust 141 for user 104. In this example, the terms of trust 141 specify that funds held in trust for user 104 are released to user 104 upon retirement and/or when user 104 reaches a specified age at which funds from the student athlete retirement trust are disbursed. The specified age includes a retirement age and an age at which the particular college athlete is no longer NCAA eligible. For example, a specified age of the particular collegiate athlete may be 70, 65, 60, 55, 50, 45, 40, 35, and 30 or various years in between these years.

In this example, server 112 executes one or more rules and/or operations that use one or more types of information 116, 120, 122, 124, 126, 128, 130 to determine income portion information 131, including, e.g., a portion of team income (that is represented by team income information 116) that is held in trust for user 104. Following determination of income portion information 131, server 112 (and/or a college) causes a transfer of funds from the college to trust 141 in an amount that equals an amount specified by income portion information 131. In some embodiments, server 112 detects that the user 104 has reached a specified age and causes a disbursement from the student athlete retirement trust to the user 104. In this example, the user 104 has reached a retirement age, e.g., 65, prior to disbursement. In another example, the user 104 is no longer NCAA eligible, prior to disbursement.

Figure 2:
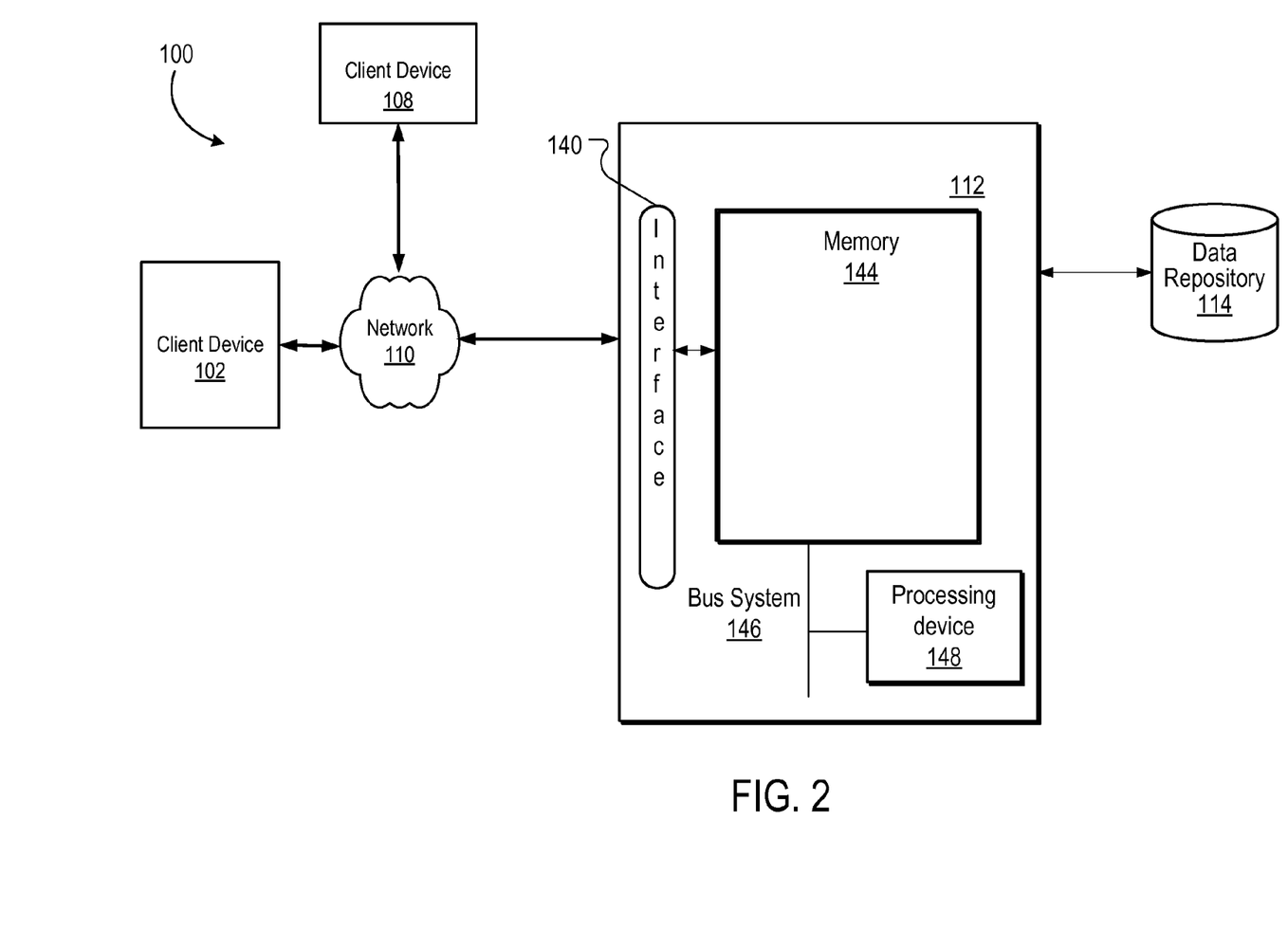
FIG. 2 is a block diagram of components of a system for determining and investing a portion of aggregate income from a university.

In still other examples, various financial vehicles (e.g., IRAs, 401(k)s, and so forth) allow for early disbursement, e.g., upon satisfaction of various conditions such as hardship and medical expenses. When the funds that are held for trust (for the student athlete) are invested in such a financial vehicle that allows for early disbursement, a student athlete may receive an early disbursement, e.g., if and when the student athlete is able to satisfy one or more of the conditions that allows for the early disbursement. FIG. 2 is a block diagram of components of network environment 100. In FIG. 2, client devices 102, 108 can be any sort of computing devices capable of taking input from a user and communicating over network 110 with server 112 and/or with other client devices. For example, client devices 102, 108 can be mobile devices, desktop computers, laptops, cell phones, personal digital assistants ("PDAs"), iPhone, smart phones, iPads, servers, embedded computing systems, and so forth.

Network environment 100 also includes memory 144, a bus system 146, and a processor 148. Memory 144 can include a hard drive and a random access memory storage device, such as a dynamic random access memory, machine-readable media, or other types of non-transitory machine-readable storage devices. A bus system 146, including, for example, a data bus and a motherboard, can be used to establish and to control data communication between the components of server 112. Processor 148 may include one or more microprocessors and/or processing devices. Generally, processor 148 may include any appropriate processor and/or logic that is capable of receiving and storing data, and of communicating over a network (not shown).

Server 112 can be any of a variety of computing devices capable of receiving data, such as a server, a distributed computing system, a desktop computer, a laptop, a cell phone, a rack-mounted server, and so forth. Server 112 may be a single server or a group of servers that are at a same location or at different locations. The illustrated server 112 can receive data from client devices 102, 108 via input/output ("I/O") interface 140. I/O interface 140 can be any type of interface capable of receiving data over a network, such as an Ethernet interface, a wireless networking interface, a fiber-optic networking interface, a modem, and so forth.

Figure 3:
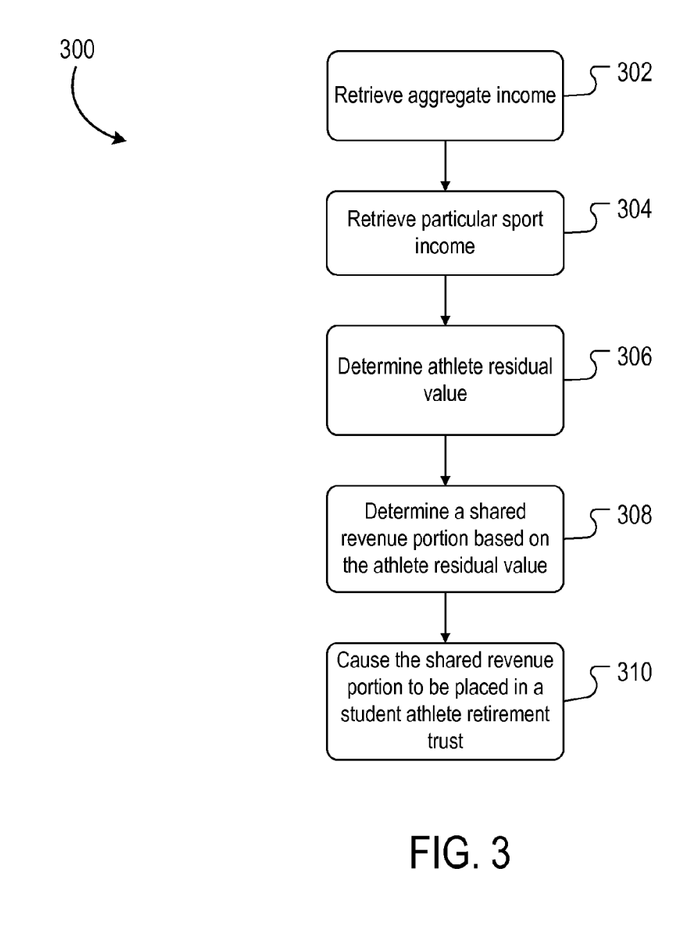
FIGS. 3 and 4 are flow charts of processes executed by a system for determining and investing a portion of aggregate income from a university.

Referring now to FIG. 3, server 112 implements process 300 in determining the portion of the university's aggregate income that is attributable to collegiate sports (e.g., as represented by aggregate income information 124) to be placed in a student athlete retirement trust (e.g., trust 141) for the particular athlete. In operation, server 112 retrieves (302), from data repository 114, the aggregate income attributable to a plurality of collegiate athletic teams at a particular university (e.g., as represented by aggregate income information 124). The aggregate income may include, for example, monies and barter dollars earned from broadcasting college sports programs, playing sports at the school, including but not limited to TV income, ticket sales, merchandise sales, and concessions at stadiums.

Server 112 also retrieves (304) information (e.g., team income information 116) indicative of income attributable to a particular sports team. Using the aggregate income that is attributable to the plurality of collegiate sports teams and the income that is attributable to the particular collegiate sports team in the plurality, server 112 determines (306) an athlete residual value. Generally, an athlete residual value is a value that is used in determining a portion of remaining aggregate income (income that remains after at least a portion of expenses are deducted from revenue) that is paid to a particular collegiate athlete and/or that is paid to a particular team. For example, an athlete residual value specifies a percentage of sports income that is shared with a particular sports team. In this example, the percentage of sports income that is shared with a particular sports team is evenly allocated among the members of the team.

Server 112 determines (308) a shared revenue portion (e.g., a portion represented by information 131) for a particular athlete based on the athlete residual value and based on the aggregate income for collegiate sports. This shared revenue portion for the particular athlete is referred to as a shared athlete revenue portion. As described in further detail below, server 112 calculates an athlete residual value for a particular team. In an example, different teams have different athlete residual values. That is, the athlete residual value specifies what portion of total collegiate sports income is attributable or shared with a particular sports team.

In an example, a college has three different sports teams, e.g., Team A, Team B, and Team C. In this example, using the techniques described herein, server 112 calculates three different athlete residual values one for each of Team A, Team B, and Team C, e.g., Athlete Residual Value$_{Team\ A}$, Athlete Residual Value$_{Team\ B}$ and Athlete Residual Value$_{Team\ C}$. In this example, each of Athlete Residual Value$_{Team\ A}$, Athlete Residual Value$_{Team\ B}$ and Athlete Residual Value$_{Team\ C}$ specifies an amount (e.g., a percentage) of the aggregate sports income that is attributable to (or otherwise payable to) athletes on the different sports teams.

In this example, a sum of Athlete Residual Value$_{Team\ A}$, Athlete Residual Value$_{Team\ B}$ and Athlete Residual Value$_{Team\ C}$ (expressed in percentages) equals a value of one, as shown below:

Athlete Residual Value$_{Team\ A}$+Athlete Residual Value$_{Team\ B}$+Athlete Residual Value$_{Team\ C}$=1

Server 112 determines a team revenue portion (for a particular team A) that is based on aggregate income for a plurality of collegiate sports at a university and the athlete residual value for the particular team, as indicated in the below Table 1A.

TABLE 1A

Team Revenue Portion$_{Team\ A}$ =
Aggregate income * Athlete Residual Value$_{Team\ A}$ In the example of Table 1A, server 112 determines the team revenue portion by multiplying the aggregate income by the athlete residual value for a particular team. In an example, aggregate income includes an amount of income derived or otherwise attributable to a sports program at a university. In another example, aggregate income includes an amount of income that is designated as being revenue shared with college athletes. That is, the aggregate income is a portion of athletic department aggregate income that has been designed for revenue sharing. Server 112 determines the shared athlete revenue portion (per year) for a particular athlete by dividing the team revenue portion by the number of athletes on the particular team (as represented by team size information 122), as shown in the below Table 1B.

TABLE 1B

Athlete revenue portion$_{Team\ A}$ =
Team Revenue Portion$_{Team\ A}$/Number of Athletes$_{Team\ A}$ In this example, Athlete revenue portion$_{Team\ A}$ includes portion 131 (FIG. 1). Server 112 causes (310) the shared athlete revenue portion for the particular student athlete (e.g., Athlete revenue portion$_{Team\ A}$) to be placed in a student athlete retirement trust for the particular student athlete by server 112 causing a transfer of funds in the determined amount from an account associated with the college to a financial institution that is holding the funds for the particular collegiate athlete.

Server 112 determines an athlete residual value (for a particular team) using aggregate income information 124, team income information 116, aggregate scholarship information 126 (e.g., an amount and/or a number of scholarships received by a university for sports programs), team scholarship information 120 for a particular sports team, e.g., an amount and/or a number of scholarships received by a university for a particular sports team, and number of student athletes (e.g., team size information 122 and aggregate team size information 128). In this example, server 112 and data repository 114 is used for tracking of college revenues and/or income.

Figure 4:
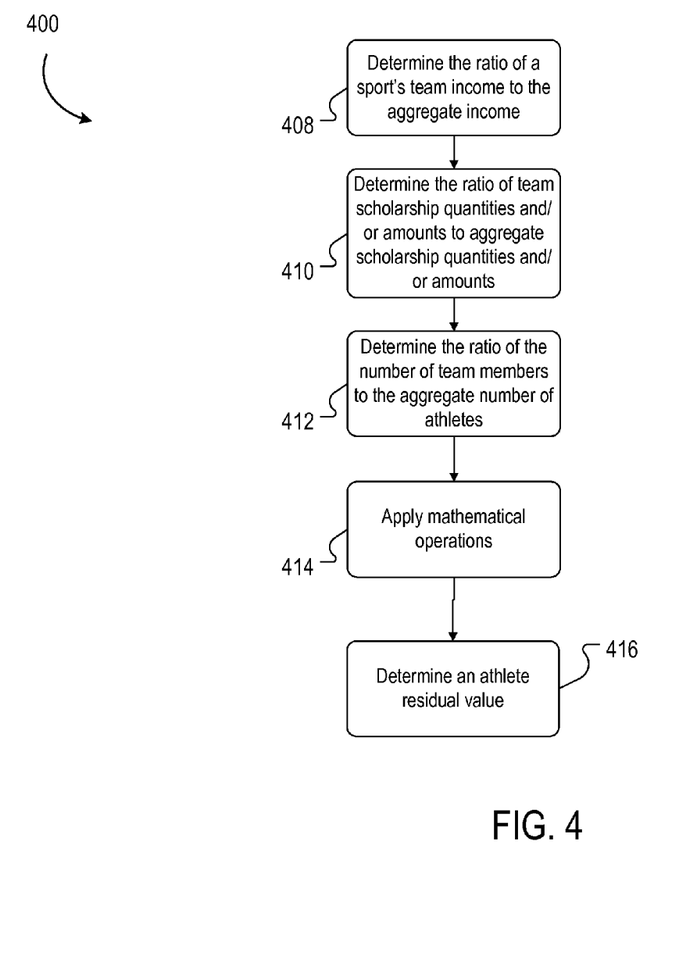

Referring now to FIG. 4, server 112 determines 400 an athlete residual value. Using retrieved aggregate income and retrieved income for a particular sports team, server 112 determines (408) an income ratio of the income attributable to a particular collegiate sports team (e.g., sports team A) to the aggregate income generated by a plurality of collegiate sports at the university (i.e., athletic department aggregate income), as shown in the below Table 2.

TABLE 2

Income Ratio$_{Team\ A}$ = Income$_{Team\ A}$/Athletic Department Aggregate Income In the example of FIG. 4, server 112 also determines (410) a scholarship ratio of a quantity (and/or amount) of scholarships provided to a particular collegiate team (e.g., Team A) multiplied by the aggregate quantity (and/or amount) of athletic scholarships at the university, as shown in the below Table 3:

TABLE 3

Scholarship Ratio$_{Team\ A}$ = (Team A Scholarships)/(Total Sports Scholarships)

In this example, server 112 also determines (412) a team size ratio the number of collegiate athletes on a particular team (e.g., Sports A) to the total number of collegiate athletes at the university, as shown in the below Table 4:

TABLE 4

Team size ratio$_{Team\ A}$ = Team A Players/Total # Players

In an example, server 112 applies (414) one or more mathematical operations to the income ratio, the scholarship ratio and the team size ratio for Team A. There are various types of applied mathematical operations, including, e.g., additive operations. In this example, the mathematical operations define a relationship among the income ratio, the scholarship ratio and the team size ratio for Team A, as shown below:

$$\text{Athlete residual value}_{Team\ A} = (\text{Income Ratio}_{Team\ A}) + (\text{Scholarship Ratio}_{Team\ A}) + (\text{Team Size Ratio}_{Team\ A}).$$

Based on application of the mathematical operation, server 112 determines (416) an athlete residual value (for Team A) based on the income ratio, the scholarship ratio and the team size ratio for Team A. For example, the athlete residual value includes the sum of the income ratio, the scholarship ratio, and the team size ratio.

In another example, before combination, server 112 may adjust one or more of the income ratio, the scholarship ratio, the team size ratio, or any combination thereof by a weighted value that promotes collegiate teams with the greatest income receiving the greatest shared revenue portion. For example, the weighted values can be from 0.25 to 0.4, e.g., 0.25, 0.28, 0.3, 0.32, 0.34, 0.36, 0.38, 0.40. In this example, the income ratio may be multiplied by 0.34, the scholarship ratio may be multiplied by 0.3, and the team size ratio may be multiplied by 0.36, as shown in the following athlete residual value formula in the below Table 5:

In Table 5 below, the athlete residual value is computed for a particular team, e.g., Team A.

TABLE 5

$$\text{Athlete residual value}_{Team\ A} = (0.34)(\text{Income Ratio}_{Team\ A}) + (0.3)(\text{Scholarship Ratio}_{Team\ A}) + (0.36)(\text{Team Size Ratio}_{Team\ A}).$$

In some embodiments, server 112 monitors investments placed in the student athlete retirement trusts and transmits information, e.g., statements, graphical representations, pertaining to these athlete retirement trusts over the network 110 to the client devices 102, 108. The users 104, 106 may monitor the student athlete retirement trusts via the client devices 102, 108. In another example, statements may be delivered electronically or physically to the users 102, 106. Monitoring and statements may continue until the collegiate athlete reaches a specified age, e.g., 65, another retirement age, and/or until the collegiate athlete is no longer NCAA eligible. In this example, student athletes will not select or choose investment vehicles. Rather, the investment vehicles (e.g., the trusts) will be placed in managed account by professional who have plans to mature the accounts by years. In this example, the funds in the trust will grow tax deferred (e.g., if the funds are structured within a traditional IRA) but will be taxable to the student athlete upon disbursement.

Custody of the determined portion of the aggregate income in the student athlete retirement trust for the particular athlete prevents the particular athlete from being paid for participating in the particular collegiate sports team until the particular athlete reaches a specified age. Server 112 is configured to monitor an age of the particular athlete, e.g., by receiving information from the NCAA or receiving information from a university specifying an age of the athlete when the athlete becomes a member of the university's sports program, and so forth.

In this example, one of the provisions of the trust (e.g., trust 141) is that funds are disbursed to an athlete at retirement age, e.g., age sixty-five. The server 112 monitors the age of the particular athlete and when the server 112 detects that the particular athlete has reached a specified age (e.g., a retirement age), server 112 causes a disbursement from the student athlete retirement trust to the particular athlete. In an example, server 112 causes the disbursement by sending a notification and/or instructions to the financial institution 140 to cause a disbursement for a specified amount. In an example, the funds in trust 141 are disbursed in even amounts from the age of retirement to an expected age of death. In this example, the disbursement amounts are equal in value. For example, if the retirement age is 65 and an expected age of death is 85, the funds in trust 141 are evenly disbursed (e.g., on a yearly basis and over a twenty year period), such that when the athlete reaches age 85 the funds in trust 141 are depleted.

In another example, trust 141 is an annuity trust. In this example, when the athlete reaches the specified age, an annuity payment (e.g., of a predefined amount) is made to the athlete annually and until death. Upon death of the athlete, the financial intuition 140 becomes the owner of any remainder in the trust funds.

In still another example, the funds in trust 141 are held until the particular athlete is not NCAA eligible, e.g., is no longer a NCAA athlete. In this example, server 112 receives from the NCAA statements that indicate NCAA athletes and/or statements that include names of individuals who are no longer NCAA eligible. Using the statements, server 141 detects that the particular athlete is not NCAA eligible, e.g., because the particular athlete is no longer included on the statements. Upon this detection, server 112 causes a disbursement from the student athlete retirement trust to the particular athlete.

Server 112 includes a record keeping system to track data in a tiered manner, with the lowest level being an individual contribution record made at least once per year that a student plays. This record includes an identifier that is associated with the student. Various types of identifiers can be used including, e.g., a social security number, an alternative-ID, such a student ID, and so forth. The record also includes a field for a total number of units or shares of a fund that are in trust for the student, a date field and other fields that promote logging and tracking of the record. The record also includes information specifying an amount of funds, shares, units or earning segments that the athlete has earned each year.

Using contents of the record, server 112 determines an amount of funds that are available for investment and initiates purchasing of shares of a mutual fund or a long-term investment vehicle that a trustee has determined is appropriate to support the athlete's retirement goals (e.g., a timeframe of retiring at sixty or seventy years of age). Following the purchase, the record is updated to reflect an account number for the purchased fund and an amount of shares purchased.

Each year a student athlete participates in a collegiate sport, server 112 generates an individual contribution record for the student athlete. Server 112 tracks and accumulates these records over time to reflect equitable ownership rights (i.e., equitable title in contrast to legal title) or as an alternative, actual ownership of shares in a fund of a student. Server 112 aggregates (e.g., rolls-up) the individual records to calculate an aggregate balance or amount of fund ownership for a student.

The recording keeping system of server 112 enables a student account to increase in value by adding more units to the account (e.g., when the account is a money market fund) or by the units growing in value (e.g., when the account is a mutual fund). Additionally, server 112 tracks records for multiple athletes (on a yearly basis) and for multiple schools. Server 112 aggregates the records for athletes at a particular school, e.g., to determine an aggregate balance in the funds that are held by athletes of the particular school.

Referring back to FIG. 1, environment 100 also includes a funding and transfer system 111 for purchasing shares of a fund and for transferring funds to a financial institution for the purchase. The funding and transfer system 111 is associated with a trustee bank and/or a trustee. A university sends funds that are allocated to various students to a trustee bank that in turn makes the funds available to the trustee. The trustee causes a transfer of the funds to the financial institution 140 for purchases of funds. The trustee coverts the funds to units or shares either at a record level by student or a master trust per school level, e.g., by using the funds to purchase units or shares. The record keeping system tracks the per student level of funds.

In another example, the techniques and system described maintain an amateur athletic trust that is held in an amateur athletic account. The amateur athletic account holds shares of a financial vehicle, e.g., a mutual fund. In this example, the amateur athletic account is not a retirement account and the funds vest after a time period that is independent of retirement. For example, the funds vest following satisfaction of predefined conditions, including, e.g., an individual is no longer NCAA eligible, an individual graduates from a college or university and so forth.

In this example, server 112 determines an amount of funds to be distributed to a particular student athlete on an annual basis. The determined amount of funds per student athlete are independent of a residual value and are rather based on (i) an aggregate income that is derived or otherwise attributable to a sports program at a university, and (ii) a number of students participating in a college sports program, as shown below Table 6:

TABLE 6

Athlete revenue portion$_{For\ a\ particular\ Student\ Athlete}$ = Aggregate Income/Number of Athletes$_{Participating\ in\ Sports\ Program}$ As shown in the above formula in Table 6, the aggregate income is evenly distributed among student athletes participating in the college athletic program (e.g., a NCAA, non-intramural athletic program). In another example, the aggregate income includes a portion of the income (i) that is derived from or otherwise attributable to a sports program, and (ii) that has been designated as being eligible for allocation to student athletes (e.g., via various trust vehicles). In this example, even if sports team A derives more income for a university than sports team B, each of the athletes in sports teams A and B receive an equal amount of funds (that are held in trust), when funds are distributed to student athletes in accordance with the equation shown in the above Table 6.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood that various modifications may be made without departing from the spirit and scope of the invention.

What is claimed is:

1. A computer-implemented method comprising:
retrieving by a computer information indicative of aggregate income attributable to a plurality of collegiate sports teams and income attributable to a particular collegiate sports team in the plurality of collegiate sports teams;
for a particular collegiate sports team,
determining by the computer an athlete residual value for the particular collegiate sports team, with the athlete residual value being based on a sum of a first ratio of the income that is attributable to the particular collegiate sports team to the aggregate income that is attributable to the plurality of collegiate sports teams, a second ratio of a number or an amount of scholarships that is attributable to the particular collegiate sports team to an aggregate number or an aggregate amount of scholarships attributable to the plurality of collegiate sports teams, and a third ratio of a number of athletes on the particular collegiate sports team to an aggregate number of athletes participating in the plurality of collegiate sports teams;
determining, based on the athlete residual value, a portion of the aggregate income that is revenue shared with a particular athlete of the particular collegiate sports team; and
causing the determined portion of the aggregate income to be placed in a student athlete retirement trust for the particular athlete.

2. The computer-implemented method of claim 1, further comprising:

applying a first weighed value to the first ratio;
applying a second weighed value to the second ratio; and
applying a third weighed value to the third ratio.

3. The method of claim 2, wherein applying the first, second, and third weighted values causes the determined portion of the aggregate income to be proportionate to the first ratio of (i) income attributable to the particular collegiate sports team, to (ii) the aggregate income attributable to the plurality of collegiate sports teams.

4. The method of claim 2, wherein the first weighted value is 0.34, the second weighted value is 0.30 and the third weighted value is 0.36.

5. The computer-implemented method of claim 1, wherein determining, based on the athlete residual value, the portion of the aggregate income that is revenue shared with the particular athlete comprises:
computing a ratio of (i) an amount of the aggregate income multiplied by the athlete residual value, to (ii) a number of athletes on the particular collegiate sports team in the plurality.

6. The computer-implemented method of claim 1, wherein determining, based on the athlete residual value, the portion of the aggregate income that is revenue shared with the particular athlete comprises:
determining, based on (i) the athlete residual value, (ii) an amount of the aggregate income, and (i) a number of athletes on the particular collegiate sports team in the plurality, the portion of the aggregate income that is revenue shared with the particular athlete.

7. The computer-implemented method of claim 1, wherein causing the determined portion of the aggregate income to be placed in the student athlete retirement trust for the particular athlete prevents the particular athlete from being paid for participating in the particular collegiate sports team until the particular athlete reaches a specified age.

8. The computer-implemented method of claim 1, further comprising:
detecting that the particular athlete has reached a specified age; and
causing a disbursement from the student athlete retirement trust to the particular athlete.

9. The computer-implemented method of claim 1, further comprising:
detecting that the particular athlete is not NCAA eligible; and
causing a disbursement from the student athlete retirement trust to the particular athlete.

10. One or more machine-readable hardware storage devices storing instructions that are executable by one or more processing devices to perform operations comprising:
retrieving information indicative of aggregate income that is attributable to a plurality of collegiate sports teams and income that is attributable to a particular collegiate sports team in the plurality;
for the particular collegiate sports team,
determining an athlete residual value that is based on a sum of a first ratio of the income that is attributable to the particular collegiate sports team, to the aggregate income that is attributable to the plurality of collegiate sports teams, a second ratio of a number or an amount of scholarships that is attributable to the particular collegiate sports team, to an aggregate number or an aggregate amount of scholarships attributable to the plurality of collegiate sports teams, and a third ratio of a number of athletes on the particular collegiate sports team, to an aggregate number of athletes participating in the plurality of collegiate sports teams;
determining, based on the athlete residual value, a portion of the aggregate income that is revenue shared with a particular athlete who is a member of the particular collegiate sports team; and
causing the determined portion of the aggregate income to be placed in a student athlete retirement trust for the particular athlete.

11. The one or more machine-readable hardware storage devices of claim 10, wherein the operations further comprise:
applying a first weighed value to the first ratio;
applying a second weighed value to the second ratio; and
applying a third weighed value to the third ratio.

12. The one or more machine-readable hardware storage devices of claim 11, wherein applying the first, second, and third weighted values causes the determined portion of the aggregate income to be proportionate to the first ratio of (i) income attributable to a particular collegiate sports team, to (ii) the aggregate income attributable to the plurality of collegiate sports teams.

13. The one or more machine-readable hardware storage devices of claim 10, wherein determining, based on the athlete residual value, the portion of the aggregate income that is revenue shared with the particular athlete comprises:
computing a ratio of (i) an amount of the aggregate income multiplied by the athlete residual value, to (ii) a number of athletes on the particular collegiate sports team in the plurality.

14. An electronic system comprising one or more processing devices and one or more machine-readable hardware storage devices storing instructions that are executable by the one or more processing devices configured to perform operations comprising:
retrieving information indicative of aggregate income that is attributable to a plurality of collegiate sports teams and income that is attributable to a particular collegiate sports team in the plurality;
for the particular collegiate sports team,
determining an athlete residual value that is based on a sum of a first ratio of the income that is attributable to the particular collegiate sports team, to the aggregate income that is attributable to the plurality of collegiate sports teams, a second ratio of a number or an amount of scholarships that is attributable to the particular collegiate sports team, to an aggregate number or an aggregate amount of scholarships attributable to the plurality of collegiate sports teams, and a third ratio of a number of athletes on the particular collegiate sports team, to an aggregate number of athletes participating in the plurality of collegiate sports teams;
determining, based on the athlete residual value, a portion of the aggregate income that is revenue shared with a particular athlete who is a member of the particular collegiate sports team; and
causing the determined portion of the aggregate income to be placed in a student athlete retirement trust for the particular athlete.

15. The electronic system of claim 14, further comprising:
applying a first weighed value to the first ratio;
applying a second weighed value to the second ratio; and
applying a third weighed value to the third ratio.

16. The electronic system of claim 14, wherein determining, based on the athlete residual value, the portion of the aggregate income that is revenue shared with the particular athlete comprises:

computing a ratio of (i) an amount of the aggregate income multiplied by the athlete residual value, to (ii) a number of athletes on the particular collegiate sports team in the plurality.

17. The one or more machine-readable hardware storage devices of claim 10, wherein causing the determined portion of the aggregate income to be placed in the student athlete retirement trust for the particular athlete prevents the particular athlete from being paid for participating in the particular collegiate sports team until the particular athlete reaches a specified age.

18. The one or more machine-readable hardware storage devices of claim 10, wherein the operations further comprise:
   detecting that the particular athlete has reached a specified age; and
   causing a disbursement from the student athlete retirement trust to the particular athlete.

19. The electronic system of claim 14, wherein causing the determined portion of the aggregate income to be placed in the student athlete retirement trust for the particular athlete prevents the particular athlete from being paid for participating in the particular collegiate sports team until the particular athlete reaches a specified age.

20. The electronic system of claim 14, wherein the operations further comprise:
   detecting that the particular athlete has reached a specified age; and
   causing a disbursement from the student athlete retirement trust to the particular athlete.

* * * * *